United States Patent [19]
Narayan

[11] Patent Number: 6,077,456
[45] Date of Patent: Jun. 20, 2000

[54] POLYMETHYLENE POLYPHENYL POLYISOCYANATE BASED PREPOLYMERS

[75] Inventor: Thirumurti Narayan, Grosse Ile, Mich.

[73] Assignee: BASF Corporation, Mt. Olive, N.J.

[21] Appl. No.: 08/263,496

[22] Filed: Jun. 20, 1994

Related U.S. Application Data

[63] Continuation of application No. 07/881,922, May 12, 1992, abandoned.

[51] Int. Cl.$^7$ .................................................. C08G 18/10
[52] U.S. Cl. ............................ 252/182.22; 252/182.2; 252/182.21; 521/159; 521/160; 528/60; 528/61; 528/62; 528/63; 528/64; 528/65; 528/66
[58] Field of Search ........................... 252/182.2, 182.21, 252/182.22; 521/159, 160; 528/60, 61, 62, 63, 64, 65, 66

[56] References Cited

U.S. PATENT DOCUMENTS

| | | | |
|---|---|---|---|
| 3,968,089 | 7/1976 | Cuscurida et al. | 260/859 R |
| 4,031,026 | 6/1977 | Ibbotson | 252/182.22 |
| 4,237,240 | 12/1980 | Jarre et al. | 521/159 |
| 4,251,639 | 2/1981 | Jarre et al. | 521/159 |
| 4,261,852 | 4/1981 | Carroll et al. | 528/59 |
| 4,478,960 | 10/1984 | Buethe et al. | 521/160 |
| 4,738,991 | 4/1988 | Narayan | 521/124 |
| 4,743,626 | 5/1988 | Narayan | 521/160 |
| 4,888,365 | 12/1989 | Riley et al. | 521/159 |
| 4,937,012 | 6/1990 | Kan et al. | 252/182.21 |
| 5,070,114 | 12/1991 | Watts et al. | 528/67 |
| 5,091,437 | 2/1992 | Lunardon et al. | 521/159 |
| 5,132,334 | 7/1992 | Gansen et al. | 521/160 |

FOREIGN PATENT DOCUMENTS

| | | |
|---|---|---|
| 102541-A2 | 3/1984 | European Pat. Off. . |
| 439792-A2 | 8/1991 | European Pat. Off. . |
| 480090-A1 | 4/1992 | European Pat. Off. . |
| 1 444 192 | 7/1976 | United Kingdom . |
| 1 450 660 | 9/1976 | United Kingdom . |

*Primary Examiner*—Rachel Gorr
*Attorney, Agent, or Firm*—Fernando A. Borrego

[57] ABSTRACT

This invention is a liquid polyisocyanate prepolymer comprising the reaction product of an organic polyisocyanate blend and a polyoxyalkylene polyol, where polyisocyanate blend is A) a diphenylmethane diisocyanate comprising from 50 weight percent to 95 weight percent 4,4'-diphenylmethane diisocyanate, from 5 weight percent to 50 weight percent 2,4'-diphenylmethane diisocyanate, and less than 10 weight percent 2,2'-diphenylmethane diisocyanate, said weight percentages based on the total weight of the ingredients in A);

B) a polymethylene polyphenyl polyisocyanate comprising from 30 weight percent to 70 weight percent diphenylmethane diisocyanate, the remainder comprising polymethylene polyphenyl polyisocyanates having functionalities greater than two, said weight percentages based on the total weight of the ingredients in B);

C) and optionally a uretonimine-carbodiimide modified diisocyanate comprising from 10 weight percent to 35 weight percent uretonimine-carbodiimide species, the remainder comprising essentially pure 4,4'-diphenylmethane diisocyanate, said weight percentages based on the weight of the ingredients in C);

and the polyoxyalkylene polyol has a molecular weight ranging from 700 to 10,000 and an average functionality from 1.6 to about 3 and reacted with the polyisocyanate blend at temperatures less than 80° C. The liquid polyisocyanate prepolymer has an overall NCO content of from 10 weight percent to 31 weight percent. The prepolymer is used to make polyurethane foams advantageously blown only with water.

22 Claims, No Drawings

POLYMETHYLENE POLYPHENYL POLYISOCYANATE BASED PREPOLYMERS

This is a continuation of application Ser. No. 07/881,922 filed May 12, 1992, now abandoned.

The present invention relates to a polyisocyanate prepolymer composition, its method of preparation, and its use in the manufacture of polyurethane foams; more particularly, this invention relates to a polyisocyanate composition comprising the reaction product of a blend of polymethylene polyphenyl polyisocyanates and isomers of diphenylmethane diisocyanate with a polyoxyalkylene polyether polyol.

The reaction of polyisocyanates with a polyether polyol or a polyester polyol in the presence of a catalyst and blowing agent to manufacture a polyurethane foam is well known in the art. During the mixing of the isocyanate and resin components, it is desirable to use isocyanates that are liquid at room temperature to promote a uniform and homogenous mixture free of solid particles. If pure 4,4'-diphenylmethane diisocyanates are to be used in the manufacture of flexible foams, however, being typically solid at room temperature, those require processing at elevated temperatures to melt the solid crystals before metering.

Various solutions to the problem have been proposed by the industry to lower the melting point of diphenylmethane diisocyanates. In one patent to Ibbotson, U.S. Pat. No. 4,031,026, it was proposed to make a prepolymer composition by reacting a diphenylmethane diisocyanate with a low molecular weight (less than 175) diol and blending the prepolymer with further diphenylmethane diisocyanate (MDI), and optionally, less than 10 percent by weight, polymethylene polyphenylene polyisocyanate (Polymeric-MDI). As an alternative procedure, Ibbotson proposes reacting a blend of MDI and uretonimine modified-MDI with the low molecular weight diol, with polymeric-MDI being optionally present or added later.

In further developments, it has been proposed in Carroll et al., U.S. Pat. No. 4,261,852, to make storage stable polyisocyanates useful in polyurethane foams having good compression sets by making a prepolymer having an NCO content of from 8 to 26 percent obtained by reacting 50 to 90 percent MDI and a polyether polyol having high molecular weights from about 1500 to 9000 (eq. wt. 750–3000), blended with 10 to 50 percent of polymeric-MDI containing 30 to 65 percent MDI. In a further modification to this process, Lunardon, U.S. Pat. No. 5,091,437, proposed a similar variation by making a prepolymer having a higher free NCO content of from 26.5 percent to 33 percent obtained by reacting 50 to 90 percent organic diisocyanate with a high molecular weight (1000–8000) polyether polyol, blended with 10 to 50 percent polymeric MDI. The higher free NCO content in the Lunardon et al. process produces foams having a higher open cell content and does not require mangling or pressing. These two methods of making a polyisocyanate, however, involve a two-step process, i.e., formation of the prepolymer and subsequent blending with polymeric-MDI.

Until now, it was believed that reacting a blend of polymeric-MDI and diphenylmethane diisocyanate with a polyol for manufacture of foams would yield inconsistent product quality since the functionality of the prepolymer species would be unknown. Polymeric-MDI is made by the phosgenation of a mixture of polyamines obtained by the acid condensation of aniline and formaldehyde. The acid condensation of aniline and formaldehyde yields a reaction product composed of diaminodiphenylmethane along with polymethylene polyphenyl polyamines having functionalities of 3 or greater, known as higher oligomers. Polymeric-MDI is made by phosgenation of the polyamine mixture. However, the precise composition of the higher polyamine oligomers species and, upon reaction with phosgene, the higher polyisocyanate oligomer species is unknown.

It was believed that if a polyol was made to react with a blend of polymeric-MDI and MDI, the polyol would react with the diisocyanate as well as the higher oligomers yielding a prepolymer species having an unknown functionality, but greater than the predicted functionality if one were to use only diisocyanate.

If a prepolymer species functionality is higher than the certain limit, the cells of the foam begin closing resulting in foam shrinkage and loss of mechanical properties. Compensation for the raised functionality requires reformulation along with a probable change in the mechanical properties of the foam, which reformulation could in any case be difficult since the functionality of the prepolymer species is unknown. It has now been discovered, however, that at certain reaction temperatures the polyether polyol appears to react predominately with the diisocyanate species in a blend of polymeric-MDI and MDI, thus producing a foam having no shrinkage and mechanical properties equivalent to a foam prepared by a prepolymer species made with only MDI.

SUMMARY OF THE INVENTION

It has now been discovered that a good polyisocyanate prepolymer can be made by first blending together polymeric-MDI and diphenylmethane diisocyanate, subsequently reacting the blend with a polyoxyalkylene polyether polyol having a molecular weight of 700 to 10,000 and an average functionality of 1.6 to about 4, at a temperature less than 80° C. to obtain a prepolymer having a free NCO content from 10 to 31 percent by weight.

Upon reacting the prepolymer with resin side components, a foam is obtained which exhibits an open-celled content equivalent to a foam prepared by employing a prepolymer made with pure MDI. This process also is time efficient since it is a one-step process.

DETAILED DESCRIPTION OF THE INVENTION

It is not known for certain why the prepolymer prepared with a blend of polymeric-MDI and MDI does not produce a flexible foam which shrinks or one with degraded mechanical properties. Without being bound to a theory, it is believed that the polyether polyol reacts with the higher oligomers in the polymeric-MDI to some advantageous extent but not sufficiently to cause foam shrinkage over a foam prepared by reacting a polyether polyol with pure MDI. Thus, it is believed that the predominant reaction of the polyether polyol is with the diisocyanate species.

The flexible polyurethane foams of the invention are prepared by reacting in a mold an organic polyisocyanate side composition and a resin side composition under reaction conditions well known in the art.

The organic polyisocyanate composition is the reaction product of an organic polyisocyanate blend and a polyoxyalkylene polyether polyol. The organic polyisocyanate blend is comprised of diphenylmethane diisocyanate, or MDI, and polymethylene polyphenylene polyisocyanate, or polymeric-MDI, in crude form or in a modified form by removal of some diisocyanate through distillation or crystallization.

The MDI component of the blend may be any diphenylmethane diisocyanate commonly available which has 50 percent by weight to 98 weight percent 4,4'-diphenylmethane diisocyanate from 2 weight percent to 50 weight percent 2,4'-MDI, and less than 10 weight percent 2,2'-MDI. The MDI may be pure 4,4'-MDI or a mixture of 2,4'-MDI and 4,4'-MDI isomers, optionally containing less than 10 weight percent 2,2'-MDI isomer. The MDI component preferably contains 60 to 80 percent by weight 4,4'-MDI, more preferably 70 to 75 percent by weight 4,4'-MDI; preferably 15 to 40 percent by weight 2,4'-MDI, more preferably 20 to 30 percent by weight 2,4'-MDI; and preferably from 0 to 5 percent by weight 2,2'-MDI, more preferably from greater than 0 to 2 percent by weight 2,2'-MDI.

The second component in the organic blend is polymeric-MDI, which is a mixture of diphenylmethane diisocyanate isomers, triisocyanates, and higher functional oligomers. The polymeric-MDI of the invention contains from 30 to 70 percent, preferably from 35 to 55 percent diphenylmethane diisocyanate, the remainder being triisocyanate and higher functional oligomers. The diphenylmethane diisocyanate in the polymeric-MDI may be 4,4'-MDI isomer, or a mixture of 2,4'- and 4,4'-MDI having less than 20 percent by weight 2,4'-MDI.

Other organic diisocyanates may be added to the blend, such as modified diisocyanates containing allophanate, uretonimine-carbodiimide, or isocyanurate linkages. In one embodiment of the invention, the blend contains a uretonimine-carbodiimide modified diisocyanate along with MDI and polymeric-MDI. The uretonimine- carbodiimide derivative of essentially pure 4,4'-diphenylmethane diisocyanate can be made by well known techniques, such as the conversion of a portion of the isocyanate groups in diphenylmethane diisocyanate to a carbodiimide by using a phosphorous-containing catalyst at elevated temperatures, and then allowing the carbodiimide modified diphenylmethane diisocyanates to further react with unreacted isocyanate groups to form uretonimine modified MDI. The conversion from carbodiimide modified MDI to uretonimine modified MDI does not typically go to completion, having a composition containing small amounts of carbodiimide groups. Typically, from about 10 to 35 percent by weight of the MDI is converted to uretonimine-carbodiimide modified MDI species leaving from 65 to 90 percent of the MDI unreacted.

The relative amounts of MDI, polymeric-MDI, and optionally modified-MDI components that are blended to make the polyisocyanate blend preferably ranges from 20 to 50 percent by weight, more preferably 32 to 45 percent by weight polymeric-MDI; from 45 to 70 percent by weight, more preferably from 55 to 68 percent by weight diphenylmethane diisocyanate; and optionally from 1 to 15 percent by weight, more preferably from 8 to 13 percent by weight modified-MDI including any unreacted MDI, the modified-MDI preferably being a uretonimine-carbodiimide modified MDI.

The polyoxyalkylene polyol is reacted with the polyisocyanate blend to make the prepolymer. The polyoxyalkylene polyol employed is preferably a polyoxyalkylene polyether polyol, although polyester groups contained therein are also contemplated as within the invention. Methods of preparing polyoxyalkylene polyether polyols are well known, for example, by the base catalyzed addition of an alkylene oxide to an initiator molecule containing an average two or more active hydrogens, such as a polyhydric alcohol. Examples of alkylene oxide include ethylene oxide, propylene oxide, butylene oxide, amylene oxide, mixtures thereof, tetrahydrofuran, alkylene oxide-tetrahydrofuran mixtures, epihalohydrins, and aralkylene oxides such as styrene oxide. Suitable initiators include both aliphatics and aromatics, such as ethylene glycol, propylene glycol, dipropylene glycol, trimethylene glycol, 1,2-butanediol, 1,3-butanediol, 1,4-butanediol, 1,2-pentanediol, 1,4-pentanediol, 1,5-pentanediol, 1,6-hexanediol, 1,7-heptanediol, glycerol, 1,1,1-trimethylolpropane, 1,1,1-trimethylolethane, 1,2,6-hexanetriol, α-methyl glucoside, pentaerythritol, and sorbitol. Also included with the term "polyhydric alcohol" are compounds derived from phenol such as 2,2-bis(4-hydroxyphenyl)propane, commonly known as Bisphenol A.

The polyoxyalkylene polyether polyols may have either primary or secondary hydroxyl groups. Included among the polyether polyols are polyoxyethylene glycol, polyoxypropylene glycol, polyoxybutylene glycol, polytetramethylene glycol, block copolymers, for example, combinations of polyoxypropylene and polyoxyethylene glycols, poly-1,2-oxybutylene and polyoxyethylene glycols, poly-1,4-oxybutylene and polyoxyethylene glycols, and random copolymer glycols prepared from blends of two or more alkylene oxides or by the sequential addition of two or more alkylene oxides. The polyoxyalkylene polyether polyols may be prepared by any known process such as, for example, the process disclosed by Wurtz in 1859 and *Encyclopedia of Chemical Technology, Vol.* 7, pp. 257–262, published by Interscience Publishers, Inc. (1951) or in U.S. Pat. No. 1,922,459.

Polyethers which are preferred include the alkylene oxide addition products of trimethyolpropane, glycerine, propylene glycol, dipropylene glycol, and 2,2'-(4,4'-hydroxyphenyl)propane and mixtures of diols and triols such as propylene glycol-glycerine blends.

Alkylene oxides which are preferred are ethylene oxide and propylene oxide or mixtures thereof reacting with the initiator molecule to make polyoxyalkylene polyether polyols having predominately polyoxypropylene groups with from 0 to 30 percent by weight polyoxyethylene groups as an end cap, a block, or heteric, preferably as a cap.

The polyether polyols of the invention have a high average molecular weight ranging from 700 to 10,000, preferably from 700 to 6,000, with average functionalities from 1.6 to about 3, preferably from 2.4 to 3. Once the prepolymer is made, it may be further blended as desired with any of the known aliphatic, cycloaliphatic, araliphatic, and aromatic isocyanates.

The amount of polyoxyalkylene polyol reacted with the polymeric-MDI blend is effective to adjust the free NCO content of the prepolymer from 10 to 31 percent by weight. Suitable amounts of polyoxyalkylene polyol include from 5 parts by weight to 55 parts by weight, or 8 parts by weight to 48 parts by weight, based on 100 parts by weight of the polyisocyanate blend. The overall free NCO content of the prepolymer is preferably 22 to 31 weight percent, more preferably from 24 to 30 weight percent.

To the prepolymer is added the resin side components comprised of a polyol, a urethane-promoting catalyst, a blowing agent, and optionally a surfactant, chain extender, flame inhibitor, and antioxidants.

Polyols which may be employed for the preparation of polyurethane foams and elastomers are well known to those skilled in the art. They are often prepared by the catalytic condensation of an alkylene oxide or mixture of alkylene oxides either simultaneously or sequentially with an organic compound having at least two active hydrogen atoms, such as evidenced by U.S. Pat. Nos. 1,922,459; 3,190,927; and 3,346,557. Representative polyols include polyhydroxyl-containing polyesters, polyoxyalkylene polyether polyols such as the aforementioned polyoxyalkylene polyether polyols, polyhydroxy-terminated polyurethane polymers, polyhydroxyl-containing phosphorous compounds, and alkylene oxide adducts of polyhydric polythioesters, polyacetals, aliphatic polyols and thiols, ammonia, and amines including aromatic, aliphatic, and heterocyclic amines, as well as mixtures thereof. Alkylene oxide adducts of compounds which contain two or more different groups within the above-defined classes may also be used, for example, amino alcohols which contain an amino groups and a hydroxyl group. Also, alkylene oxide adducts of compounds which contain one SH group and one OH group as well as those which contain an amino groups and an SH group may be used. Generally, equivalent weight of the polyols will vary from 100 to 10,000, preferably from 250 to 3,000.

Any suitable hydroxy-terminated polyester may be used such as are prepared, for example, from polycarboxylic acids and polyhydric alcohols. Any suitable polycarboxylic acid may be used such as oxalic acid, malonic acid, succinic acid, glutaric acid, adipic acid, pimelic acid, suberic acid, azelaic acid, sebacic acid, brassylic acid, thapsic acid, maleic acid, fumaric acid, glutaconic acid, α-hydromuconic acid, β-hydromuconic acid, α-butyl-α-ethyl-glutaric acid, α,β-diethylsuccinic acid, isophthalic acid, terephthalic acid, hemimellitic acid, and 1,4-cyclohexanedicarboxylic acid. Any suitable polyhydric alcohol, including both aliphatic and aromatic, may be used such as ethylene glycol, propylene glycol, trimethylene glycol, 1,2-butanediol, 1,3-butanediol, 1,4-butanediol, 1,2-pentanediol, 1,4-pentanediol, 1,5-pentanediol, 1,6-hexanediol, 1,7-heptanediol, glycerol, 1,1,1-trimethylolpropane, 1,1,1-trimethylolethane, 1,2,6-hexanetriol, α- methyl glucoside, pentaerythritol, and sorbitol. Also included within the term "polyhydric alcohols" are compounds derived from phenol such as 2,2-bis(4-hydroxylphenyl)propane, commonly known as Bisphenol A. Preferred are diols and triols for the manufacture of flexible polyurethane foams.

The hydroxyl-containing polyester may also be a polyester amide such as is obtained by including some amine or amino alcohol in the reactants for the preparation of the polyesters. Thus, polyester amides may be obtained by condensing an amino alcohol such as ethanolamine with the polycarboxylic acids set forth above or they may be made using the same components that make up the hydroxyl-containing polyester with only a portion of the components being a diamine such as ethylene diamine.

Any suitable polyoxyalkylene polyether polyol may be used such as the polymerization product of an alkylene oxide or a mixture of alkylene oxides with a polyhydric alcohol. Any suitable polyhydric alcohol may be used such as those disclosed above for use in the preparation of the hydroxy-terminated polyesters. Any suitable alkylene oxide may be used such as those disclosed above for preparing the prepolymers. Polyethers which are preferred include the alkylene oxide addition products of trimethylolpropane, glycerine, propylene glycol, dipropylene glycol, and 2,2'-(4,4'- hydroxyphenyl)propane and blends thereof having equivalent weights of from 100 to 5,000.

Suitable polyhydric polythioethers which may be condensed with alkylene oxides include the condensation product of thiodiglycol or the reaction product of a dicarboxylic acid such as is disclosed above for the preparation of the hydroxyl-containing polyesters with any other suitable thioether glycol.

Polyhydroxyl-containing phosphorous compounds which may be used include those compounds disclosed in U.S. Pat. No. 3,639,542. Preferred polyhydroxyl-containing phosphorous compounds are prepared from alkylene oxides and acids of phosphorous having an acid equivalency of from about 72 percent to about 95 percent.

Suitable polyacetals which may be condensed with alkylene oxides include the reaction product of formaldehyde or other suitable aldehyde with a dihydric alcohol or an alkylene oxide such as those disclosed above.

Suitable aliphatic thiols which may be condensed with alkylene oxides include alkanethiols containing at least two -SH groups such as 1,2-ethanedithiol, 1,2-propanedithiol, 1,3-propanedithiol, and 1,6-hexanedithiol; alkene thiols such as 2-butene-1,4-dithiol; and alkyne thiols such as 3-hexyne-1,6-dithiol.

Suitable amines which may be condensed with alkylene oxides include aromatic amines such as aniline, o-chloroaniline, p-aminoaniline, 1,5-diaminonaphthalene, methylene dianiline, the condensation products of aniline and formaldehyde, and 2,3-, 2,6-, 3,4-, 2,5-, and 2,4-diaminotoluene; aliphatic amines such as methylamine, triisopropanolamine, ethylenediamine, 1,3-diaminopropane, 1,3-diaminobutane, and 1,4-diaminobutane.

Also, polyols containing ester groups can be employed in the subject invention. These polyols are prepared by the reaction of an alkylene oxide with an organic dicarboxylic acid anhydride and a compound containing reactive hydrogen atoms. A more comprehensive discussion of these polyols and their method of preparation can be found in U.S. Pat. Nos. 3,585,185; 3,639,541 and 3,639,542.

Polyols containing graft polymer dispersions may also be employed in the invention. These are prepared by the in situ polymerization, in the polyols listed below, of an ethylenically unsaturated monomer or a mixture of ethylenically unsaturated monomers. Representative ethylenically unsaturated monomers which may be employed in the present invention include butadiene, isoprene, 1,4-pentadiene, 1,6-hexadiene, 1,7-octadiene, styrene, α- methylstyrene, 2-methylstyrene, 3-methylstyrene and 4-methylstyrene, 2,4-dimethylstyrene, ethylstyrene, isopropylstyrene, butylstyrene, phenylstyrene, cyclohexylstyrene, benzylstyrene, and the like; substitute styrenes such as cyanostyrene, nitrostyrene, N,N-dimethylaminostyrene, acetoxystyrene, methyl 4-vinylbenzoate, phenoxystyrene, p-vinylphenyl oxide, and the like; the acrylic and substituted acrylic monomers such as acrylonitrile, acrylic acid, methacrylic acid, methyl acrylate, 2-hydroxyethyl acrylate, methyl methacrylate, cyclohexyl methacrylate, benzyl methacrylate, isopropyl methacrylate, octyl methacrylate, methacrylonitrile, ethyl α-ethoxyacrylate, methyl α-acetaminoacrylate, butyl acrylate, 2-ethylhexyl acrylate, phenyl acrylate, phenyl methacrylate, N,N-dimethylacrylamide, N,N-dibenzylacrylamide, N-butylacrylamide, methacrylyl formamide, and the like; the vinyl esters, vinyl ethers, vinyl ketones, etc., such as vinyl acetate, vinyl butyrate, isopropenyl acetate, vinyl formate, vinyl acrylate, vinyl methacrylate, vinyl methoxyacetate, vinyl benzoate, vinyltoluene, vinylnaphthalene, vinyl methyl ether, vinyl ethyl ether, vinyl propyl ethers, vinyl butyl ethers, vinyl 2-ethylhexyl ether, vinyl phenyl ether, vinyl 2 methoxyethyl ether, methoxybutadiene, vinyl 2-butoxyethyl ether, 3,4-dihydro-1,2-pyran, 2-butoxy-2'-vinyloxy diethyl ether, vinyl methyl ketone, vinyl ethyl ketone, vinyl phosphonates such as vinyl phenyl ketone, vinyl ethyl sulfone, N-methyl-N-vinyl acetamide, N-vinyl-pyrrolidone, vinyl imidazole, divinyl sulfoxide, divinyl sulfone, sodium vinylsulfonate, methyl vinylsulfonate, N-vinyl pyrrole, and the like; dimethyl fumarate, dimethyl maleate, maleic acid, crotonic acid, fumaric acid, itaconic acid, monomethyl itaconate, t-butylaminoethyl methacrylate, dimehtylaminoethyl methacrylate, glycidyl acrylate, allyl alcohol, glycol monoesters of itaconic acid, vinyl pyridine, and the like. Any of the known polymerizable monomers can be used and the compounds listed above are illustrative and not restrictive of the monomers suitable for use in this invention. Preferably, the monomer is selected from the group consisting of acrylonitrile, styrene and mixtures thereof.

The amount of ethylenically unsaturated monomer employed in the polymerization reaction is generally from 25 percent to 70 percent, preferably from 30 percent to 45 percent, based on the total weight of the product. The polymerization occurs at a temperature between about 25° C. and 180° C., preferably from 80° C. to 1350C.

The unsaturated polyols or macromers which may be employed in preparing the graft polymer dispersion may be prepared by the reaction of any conventional polyol such as those described above with an organic compound having both ethylenic unsaturation and a hydroxyl, carboxyl, anhydride, isocyanate or epoxy group or they may be prepared by employing an organic compound having both ethylenic unsaturation and a hydroxyl, carboxyl, anhydride, or epoxy group as a reactant in the preparation of the conventional polyol. Representative of such organic compounds include unsaturated mono- and polycarboxylic acids and anhydrides such as maleic acid and anhydride, fumaric acid, crotonic acid and anhydride, propenyl succinic anhydride, acrylic acid, acryloyl chloride, hydroxy ethyl acrylate or methacrylate and halogenated maleic acids and anhydrides, unsaturated polyhydric alcohols such as 2-butene-1,4-diol, glycerol allyl ether, trimethylolpropane allyl ether, pentaerythritol allyl ether, pentaerythritol vinyl ether, pentaerythritol diallyl ether, pentaerythritol vinyl ether, pentaerythritol diallyl ether, and 1-butene-3,4-diol, unsaturated epoxides such as 1-vinyl-cyclohexene-3,4-epoxide, butadiene monoxide, vinyl glycidyl ether(1-vinyloxy-2,3-epoxy propane), glycidyl methacrylate and 3-allyloxypropylene oxide (allyl glycidyl ether). If a polycarboxylic acid or anhydride is employed to incorporate unsaturation into the polyols, it is preferable to react the unsaturated polyol with an alkylene oxide, preferably ethylene or propylene oxide, to replace the carboxyl groups with hydroxyl groups prior to employment in the present invention. The amount of alkylene oxide employed is such as to reduce the acid number of the unsaturated polyol to about 5 or less.

Illustrative polymerization initiators which may be employed are the well-known free radical types of vinyl polymerization initiators such as the peroxides, persulfates, perborates, percarbonates, azo compounds, etc. These include hydrogen peroxide, dibenzoyl peroxide, acetyl peroxide, benzoyl hydroperoxide, t-butyl hydroperoxide, di-t-butyl peroxide, lauroyl peroxide, butyryl peroxide, diisopropylbenzene hydroperoxide, cumene hydroperoxide, paramenthane hydroperoxide, diacetyl peroxide, di-a-cumyl peroxide, dipropyl peroxide, diisopropyl peroxide, isopropyl-t-butyl peroxide, butyl-t-butyl peroxide, difuroyl peroxide, bis(triphenylmethyl) peroxide, bis(p-methoxybenzoyl) peroxide, p-monomethoxybenzoyl peroxide, rubene peroxide, ascaridol, t-butyl peroxybenzoate, diethyl peroxyterephthalate, propyl hydroperoxide, isopropyl hydroperoxide, n-butyl hydroperoxide, t-butyl hydroperoxide, cyclohexyl hydroperoxide, trans-decalin hydroperoxide, $\alpha$-methylbenzyl hydroperoxide, $\alpha$-methyl-$\alpha$-ethyl benzyl hydroperoxide, tetralin hydroperoxide, triphenylmethyl hydroperoxide, diphenylmethyl hydroperoxide, $\alpha,\alpha'$-azobis-(2-methyl heptonitrile), 1,1'-azo-bis(cyclohexane carbonitrile), 4,4'-azobis(4-cyanopentanoic acid), 2,2'-azobis(isobutyronitrile), 1-t-butylazo-1-cyanocyclohexane, persuccinic acid, diisopropyl peroxy dicarbonate, 2,2'-azobis(2,4-dimethylvaleronitrile), 2-t-butylazo-2-cyano-4-methoxy-4-methylpentane, 2,2'-azobis-2-methylbutanenitrile, 2-t-butylazo-2-cyanobutane, 1-t-amylazo-1-cyanocyclohexane, 2,2'-azobis(2,4-dimethyl-4-methoxyvaleronitrile, 2,2'-azobis-2-methylbutyronitrile, 2-t-butylazo-2-cyano-4-methylpentane, 2-t-butylazo-2-isocutyronitrile, to butylperoxyisopropyl carbonate and the like; a mixture of initiators may also be used. The preferred initiators are 2,2'-azobis(2-methylbutyronitrile), 2,2'- azobis (isobutyronitrile), 2,2'-azobis(2,4-dimethylvaleronitrile), 2-t-butylazo-2-cyano-4-methoxy-4-methylpentane, 2-t-butylazo-2-cyano-4-methylpentane, 2-t-butylazo-2-cyano-butane and lauroyl peroxide. Generally, from about 0.1 percent to about 10 percent, preferably from about 1 percent to about 4 percent, by weight of initiator based on the weight of the monomer will be employed in the process of the invention.

The polyurethane foams employed in the present invention are generally prepared by the reaction of a polyether polyol or a graft polymer dispersion in a polyol as disclosed above with the polyisocyanate prepolymer in the presence of a blowing agent and optionally in the presence of additional polyhydroxyl-containing components, chain-extending agents, catalysts, surface-active agents, stabilizers, dyes, fillers and pigments. Suitable processes for the preparation of cellular polyurethane products are disclosed in U.S. Pat. No. Re. 24,514 incorporated herein by reference together with suitable machinery to be used in conjunction therewith.

Another feature of the process according to this invention is the use of water, which reacts with the isocyanate mixture and provides carbon dioxide, as blowing agent. Preferably used are 2 to 8 percent by weight, in particular 2.5 to 5 percent by weight, of water based on the weight of the polyol. Instead of water alone, optionally mixtures of water and chemically inert, low- boiling, halogenated hydrocarbons can also be used as foaming agents. These include, for instance, halogenated hydrocarbons having boiling points below 50° C., preferably between -50° C. and 30° C. at atmospheric pressure. The following listing is used as an example: halogenated hydrocarbons such as monochlorodifluoromethane, dichloromonofluoromethane, dichlorofluoromethane, and trichlorofluoromethane and their mixtures, and hydrocarbons such as propane, n-butane, and isobutane as well as dimethyl ether. Suitable mixtures of water and halogenated hydrocarbons generally consist of 5 to 70 percent by weight, preferably 10 to 50 percent by weight, of water and 30 to 95 percent by weight, preferably 50 to 90 percent by weight, of halogenated hydrocarbons, with the percent by weight being based on the total weight of the blowing agent mixture. The required quantities of blowing agent mixture can be determined experimentally in a very simple manner as a function of the mixing ratio of water to halogenated blowing agents as well as the desired density of the foam and amount to approximately 2 to 40, preferably 5 to 25 percent by weight based on the weight of the polyol.

It may be appropriate to use chain-extending agents. Chain- extending agents which may be employed in the preparation of the polyurethane foams include those compounds having at least two functional groups bearing active hydrogen atoms such as water, hydrazine, primary and secondary diamines, amino alcohols, amino acids, hydroxy acids, glycols, or mixtures thereof. A preferred group of chain-extending agents includes water, ethylene glycol, 1,4-butanediol and primary and secondary diamines which react more readily with the prepolymer than does water such as phenylene diamine, 1,4-cyclohexane-bis-(methylamine), ethylenediamine, diethylenetriamine, N-(2-hydroxypropyl) ethylenediamine, N,N'-di(2-hydroxypropyl) ethylenediamine, piperazine, and 2-methylpiperazine.

Any suitable catalyst may be used including tertiary amines such as, for example, triethylenediamine, N-methylmorpholine, N-ethylmorpholine, diethylethanolamine, N-cocomorpholine, 1-methyl-4-dimethylaminoethylpiperazine, 3-methoxypropyldimethylamine, N,N,N'-trimethyl isopropyl propylenediamine, 3-diethylaminopropyldiethylamine, dimethylbenzylamine, and the like. Other suitable catalysts are, for example, stannous chloride, dibutyltin di-2-ethyl hexanoate, stannous oxide, as well as other organometallic compounds such as are disclosed in U.S. Pat. No. 2,846,408.

A surface-active agent is generally necessary for production of high grade polyurethane foam according to the present invention, since in the absence of same, the foams generally collapse or contain very large uneven cells. Numerous surface-active agents have been found satisfactory. Nonionic surface-active agents are preferred. Of these, the nonionic surface-active agents such as the well-known silicones have been found particularly desirable. Other surface-active agents which are operative, although not preferred, include paraffin oils, castor oil, turkey red oil, polyethylene glycol ethers of long chain alcohols, tertiary amine or alkanolamine salts of long chain alkyl acid sulfate esters, alkyl sulfonic esters, and alkyl arylsulfonic acids.

Among the flame retardants which may be employed are pentabromodiphenyl oxide, dibromopropanol, tris(β-chloropropyl)phosphate, 2,2-bis(bromoethyl) 1,3-propanediol, tetrakis(2-chloroethyl)ethylene diphosphate, tris(2,3-dibromopropyl)phosphate, tris(B-chloroethyl) phosphate, tris(1,2-dichloropropyl)phosphate, bis-(2-chloroethyl) 2-chloroethylphosphonate, molybdenum trioxide, ammonium molybdate, ammonium phosphate, pentabromodiphenyloxide, tricresyl phosphate, hexabromocyclododecane, melamine, and dibromoethyl-dibromocyclohexane. The concentrations of flame retardant compounds which may be employed range from 5 to 25 parts per 100 parts of polyol mixture.

Further details concerning the above-mentioned other commonly used auxiliaries and additives are contained in the literature, for instance, in the monograph by J. H. Saunders and K. C. Frisch, "High Polymers," Volume XVI, Polyurethanes, Part 1 and 2, Interscience Publishers, 1962 and 1964.

The method of manufacturing the prepolymer according to the invention proceeds by blending the desired organic isocyanates such as polymeric-MDI and MDI as defined above under agitation and dry conditions; heating the blend from about 40° C., to less than 80° C., preferably from 45° C. to 60° C.; while maintaining the temperature, charging the polyol to the blend preferably at a constant rate over a period of one (1) hour; and while continuing to maintain the temperature, allowing the contents to react over a period of 1 to 5 hours or until the desired NCO content is attained after which the reaction product is allowed to cool. All the isocyanate reactants may be charged at once, or those which are liquid can be charged first and heated, after which those which are solid at room temperature can be melted and charged to the heated reactor. If temperatures in excess of about 80° C. are used in the reaction, the polyol tends to excessively react with three-ringed and higher ringed oligomers in the blend along with excessive crosslinking reactions.

The procedure can be carried out in the absence of a reaction scavenger or deactivator like the ones mentioned in U.S. Pat. No. 4,738,991, to Narayan, such as benzoyl chloride, as would be required if only diisocyanates were employed. Polymeric-MDI contains a sufficient amount of residual acid left over from the phosgenation of MDA and polymeric-MDA to stabilize the prepolymer. The isocyanate prepolymer side and the resin side may be mixed at temperatures from 15° C. to 90° C., preferably at tank temperatures from 200C. to 35° C., and may be poured or sprayed into an open mold which is subsequently optionally closed, or may be injected at high pressures into a closed mold. The mixing can be performed mechanically by means of a stirrer or under high pressure by the impingement method. The mold temperature should be 20° C. to 60° C., preferably 30° C. to 60° C. A cellular polyurethane molding has applications in the automotive industry as head rests, spoilers, bumpers; for interior applications, such as shoe soles; and for seating applications.

The following examples illustrate the nature of the invention. For those foams processed by machine, the prepolymer is mixed with the resin side component under the following processing parameters:

| | |
|---|---|
| Metering Equipment: | High Pressure |
| Mix Head: | L-Head |
| Component Temperatures: | 25° C. Resin; |
| | 25° C. Isocyanate. |
| Mix Pressures, bar: | 170 Resin; |
| | 170 Isocyanate |
| Index | 90–115 |
| Injection Rate: | 120 g/sec. |

The following list of ingredients were employed to make the prepolymer according to the invention and foams prepared thereby:

Polyol A is a propylene oxide adduct of a glycerine-propylene glycol blend having an OH number of 57.6.

Polyol B is a propylene oxide-ethylene oxide adduct of glycerine having an OH number of 35 and an 18.5 weight percent ethylene oxide cap.

Polyol C is a propylene oxide-ethylene oxide adduct of trimethylolpropane having an OH number of 25 and a 15 weight percent ethylene oxide cap.

Polyol D is a propylene oxide-ethylene oxide adduct trimethylolpropane having a 13 weight percent ethylene oxide cap as a carrier in a graft polyol having 31 weight percent 1:1 acrylonitrile styrene and an OH number of 24.

Polyol E is an ethylene oxide-propylene oxide heteric adduct of glycerine having 25 weight percent ethylene oxide and an OH number of 46.

Isocyanate A is a polymeric-MDI having about 44 weight percent 4,4'-MDI and 2 weight percent 2,4'-MDI for a total of 46 weight percent two-ring content, having an NCO content of 31.6 weight percent.

Isocyanate B is essentially pure 4,4'-MDI having a functionality of 2.9 and an NCO content of 33.5 weight percent.

Isocyanate C is a pure MDI composition containing about 50 weight percent 2,4'-MDI, the remainder essentially 4,4'-MDI.

Isocyanate D is a liquid solvent-free uretonimine-carbodiimide modified 4,4'-MDI having about 25 weight percent uretonimine-carbodiimide modification.

DABCO 33LV is a dipropylene glycol solution containing 33 percent TEDA available from Air Products Corporation used as a polyurethane catalyst.

DABCO BL-11 is a 70 percent solution of Bis (dimethylaminoethyl)ether available from Air Products Corporation and used as a blowing catalyst.

Tegostab® B-4690 is a silicone surfactant available from Goldschmidt, Essen.

Foamrez UL-1 is a tin catalyst available from Air Products.

Niax A-1 is a catalyst sold by Union Carbide Corporation.

Tegostab B 4113 is a silicone surfactant sold by Goldschmid, Essen.

DABCO X-8154 is an amine catalyst sold by Air Products.

POLYCAT-77 is an amine catalyst available from Air Products.

PREPOLYMER 1

A first liquid organic polyisocyanate prepolymer was made by charging into a clean dry nitrogen purged reactor about 37 weight percent Isocyanate A and about 31.5 weight percent Isocyanate C, and agitating the contents under a nitrogen blanket throughout the procedure. The reactor was heated to about 50° C. and maintained at that temperature throughout the procedure. Subsequently, about 31.5 weight percent clear molten Isocyanate B was also charged to the reactor and blended for 15 minutes to make 100 weight percent of charged isocyanate.

About 24.6 parts by weight of Polyol A, based on 100 parts by weight of the isocyanate blend, was charged to the reactor at a constant rate over a period of one (1) hour. The reaction was allowed to proceed for a period of four (4) hours to yield a polyisocyanate prepolymer having an NCO content of about 25.5 weight percent and a viscosity of about 175 cps at 25° C. The reaction product was allowed to cool down to 30° C.

PREPOLYMER 2

A second isocyanate batch was prepared using the same procedure as in Example 1, except that about 33 weight percent Isocyanate A, about 40.5 weight percent of Isocyanate C, and 11 weight percent of Isocyanate D were charged and heated to 50° C., after which about 15.5 weight percent of Isocyanate B was charged to the reactor. Subsequently, about 9.5 parts by weight of Polyol B based on 100 parts by weight of the isocyanate blend was charged to the reactor and reacted at 450 to 55° C. for four (4) hours. The product had an NCO content of 29.5 weight percent and viscosity of about 64 cps at 25° C.

COMPARATIVE PREPOLYMER 3

Into a clean dry nitrogen-purged reactor was charged about 25 parts by weight Isocyanate C. The reactor was sealed and agitation commenced. After heating the reactor to about 450C., about 25 parts by weight of clear molten Isocyanate B was charged to the reactor; and the blend heated to about 75° C. At this point, about 20 parts by weight of Polyol A was added to the blend at a constant rate over a period of one (1) hour to form a prepolymer. The contents of the reactor was heated continuously over the next hour, after which heating was discontinued and about 30 parts by weight of Isocyanate A was blended to the prepolymer. The final free NCO content was 25.5 weight percent.

FOAM PROPERTIES

Each of the prepolymers made were tested for their mechanical properties by reacting each of the prepolymers with the resin components and amounts given in weight percentages indicated on Table 1 below at different indices using a high pressure mixing machine at the aforementioned processing parameters. The reactivity profile of each formulation is also stated. The foams obtained thereby possessed the mechanical properties set forth in Table 2 below.

TABLE I

| SAMPLES | 1 | 2 | 3 | 4 | 5 | 6 | 7 | 8 | 9 | 10 |
|---|---|---|---|---|---|---|---|---|---|---|
| POLYOL C | 74.62 | 74.62 | 74.62 | 94.62 | 94.62 | 94.62 | 92.0 | 94.62 | 94.62 | 94.62 |
| POLYOL D | 20 | 20 | 20 | — | — | — | — | — | — | — |
| POLYOL E | — | — | — | — | — | — | 2.7 | — | — | — |
| WATER | 3.13 | 3.13 | 3.13 | 3.2 | 3.2 | 3.2 | 3.0 | 3.2 | 3.2 | 3.2 |
| DABCO 33LV | 0.5 | 0.5 | 0.5 | 0.6 | 0.6 | 0.6 | 0.3 | 0.6 | 0.6 | 0.6 |
| DABCO BL-11 | 0.7 | 0.7 | 0.7 | — | — | — | — | — | — | — |
| DABCO DC-5043 | — | — | — | 0.1 | 0.1 | 0.1 | — | 0.1 | 0.1 | — |
| DABCO B 4113 | — | — | — | — | — | — | 0.7 | — | — | — |
| NIAX A-1 | — | — | — | 0.7 | 0.7 | 0.7 | 0.15 | 0.7 | 0.7 | 0.7 |
| TEGOSTAB B-4690 | 0.5 | 0.5 | 0.5 | 0.5 | 0.5 | 0.5 | — | 0.5 | 0.5 | 0.5 |
| POLYCAT-77 | — | — | — | — | — | — | 0.32 | — | — | — |
| FOMREZ UL-1 | 0.08 | 0.08 | 0.08 | 0.08 | 0.08 | 0.08 | — | 0.08 | 0.08 | 0.08 |
| DABCO-8154 | — | — | — | — | — | — | 0.5 | — | — | — |
| DIETHANOL-ANINE (85%) | 0.47 | 0.47 | 0.47 | 0.2 | 0.2 | 0.2 | 0.33 | 0.2 | 0.2 | 0.2 |
| TOTAL PBW RESIN | 100 | 100 | 100 | 100 | 100 | 100 | 100 | 100 | 100 | 100 |
| PREPOLYMER 1, PBW | 62.2 | 69.1 | 76.0 | 60 | 66.9 | 74.1 | — | — | — | — |
| PREPOLYMER 2, PBW | — | — | — | — | — | — | 54.8 | — | — | — |

TABLE I-continued

| SAMPLES | 1 | 2 | 3 | 4 | 5 | 6 | 7 | 8 | 9 | 10 |
|---|---|---|---|---|---|---|---|---|---|---|
| COMPARATIVE POLYMER 3, PBW | — | — | — | — | — | — | — | 61 | 66.9 | 74.1 |
| INDEX | 90 | 100 | 100 | 90 | 100 | 100 | 100 | 90 | 100 | 110 |
| TOP OF CUP (S) | — | — | — | 13 | 10 | 10 | 28 | 10 | 10 | 9 |
| RISE TIME (S) | 24 | 25 | 25 | 23 | 23 | 22 | 58 | 23 | 22 | 22 |

TABLE II

| SAMPLES | 1 | 2 | 3 | 4 | 5 | 6 | 7 | 8 | 9 | 10 |
|---|---|---|---|---|---|---|---|---|---|---|
| DENSITY (CONC.) | 2.62 | 2.56 | 2.62 | 2.71 | 2.77 | 2.77 | 3.1 | 2.69 | 2.63 | 2.61 |
| TENSILE STR. (PSI) | 19 | 22.04 | 24.37 | 13.5 | 18.3 | 21.6 | 15.2 | 12.9 | 16.4 | 16.8 |
| HTAG* TENSILE (PSI) | 18.85 | 20.16 | 21.32 | 13.7 | 17.1 | 19.2 | 13.4 | 10.9 | 13.9 | 14.4 |
| ELONGATION % | 170 | 160 | 160 | 150 | 160 | 146.7 | 102 | 156.7 | 163.3 | 146.7 |
| BLOCK TEAR (PI) | 1.9 | 1.9 | 2.1 | 1.5 | 1.6 | 1.7 | 1.5 | 1.5 | 1.6 | 1.8 |
| LOSS* AT 50% (%) | 33 | 30 | 29 | 30 | 41 | 56 | 15 | 32 | 42 | 49 |
| COMPRESSION SET (%) | | | | | | | | | | |
| 50% ORIGINAL | 11 | 12 | 13 | 21.64 | 20.95 | 25.25 | 7.7 | 22.10 | 21.04 | 19.22 |
| 50% HUAG** | 17 | 13 | 14 | 18.65 | 18.50 | 24.71 | 13.8 | 19.92 | 18.39 | 19.80 |

*5 HOURS AT 121° C. (250° F.)

A comparison of samples 8–10 corresponding to the comparative prepolymer 3 prepared by blending polymeric-MDI after formation of the MDI-based prepolymer, with samples 4–6 corresponding to the one-step process reveals that the overall mechanical properties of the inventive samples 4–6 did not suffer or degrade as a result of forming a prepolymer from both polymeric-MDI and MDI.

Upon demolding each of the blocks from samples 1–10 without crushing, no signs of shrinkage were evident. Furthermore, samples 1–7 were storage stable in liquid form at room temperature for at least six months without crystallizing.

What I claim is:

1. A liquid polyisocyanate prepolymer comprising the reaction product of an organic polyisocyanate blend and a polyoxypropylene polyether polyol, said polyisocyanate blend comprising
   A) a diphenylmethane diisocyanate component comprising from 50 weight percent to 98 weight percent 4,4'-diphenylmethane diisocyanate, from 2 weight percent to 50 weight percent 2,4'-diphenylmethane diisocyanate, and less than 10 weight percent 2,2'-diphenylmethane diisocyanate, said weight percentages based on the total weight of the ingredients in A);
   B) a polymethylene polyphenyl polyisocyanate component comprising from 30 weight percent to 70 weight percent diphenylmethane diisocyanate, the remainder comprising polymethylene polyphenyl polyisocyanates having functionalities greater than two, said weight percentages based on the total weight of the ingredients in B);
   C) and optionally a uretonimine-carbodiimide modified diisocyanate component comprising from 10 weight percent to 35 weight percent uretonimine-carbodiimide species, the remainder comprising essentially pure 4,4'-diphenylmethane diisocyanate, said weight percentages based on the weight of the ingredients in C);
   said polyoxypropylene polyether polyol having a number average molecular weight ranging from greater than 1500 to 10,000 and an average functionality from 1.6 to about 3, wherein the polyol is reacted with the polyisocyanate blend at temperatures less than 80° C., the liquid polyisocyanate prepolymer having an overall NCO content of from 22 weight percent to 31 weight percent.

2. The prepolymer of claim 1, wherein from 5 parts by weight to 48 parts by weight of the polyoxypropylene polyether polyol are reacted with the polyisocyanate blend.

3. The prepolymer of claim 2, wherein the blend contains from 45 weight percent to 70 weight percent of component A) and from 20 weight percent to 50 percent by weight of component B).

4. The prepolymer of claim 3, wherein the blend contains from 1 weight percent to 15 weight percent component C).

5. The prepolymer of claim 3, wherein component A) contains 60 weight percent to 80 weight percent 4,4'-diphenylmethane diisocyanate, 15 weight percent to 40 weight percent of 2,4'-diphenylmethane diisocyanate; and component B) contains 35 weight percent to 55 weight percent diphenylmethane diisocyanate comprised of less than 20 weight percent 2,4'-diphenylmethane based on the weight of all isomers in the diphenylmethane diisocyanates in component B), and from 45 weight percent to 65 weight percent of component B) being polymethylene polyphenyl polyisocyanate having a functionality greater than two.

6. The prepolymer of claim 5, wherein the NCO content is from 24 weight percent to 30 weight percent.

7. The prepolymer of claim 3, wherein the amount of component A) is 55 weight percent to 68 weight percent, and of component B) is 32 weight percent to 45 weight percent.

8. A process making a liquid polyisocyanate prepolymer comprising reacting an organic polyisocyanate blend and a polyoxypropylene polyether polyol at temperatures less than 80° C., said polyisocyanate blend comprising A) a diphenylmethane diisocyanate component comprising from 50 weight percent to 98 weight percent 4,4'-diphenylmethane diisocyanate, from 2 weight percent to 50 weight percent 2,4'-diphenylmethane diisocyanate, and less than 10 weight percent 2,2'-diphenylmethane diisocyanate, said weight percentages based on the total weight of the ingredients in A);

B) a polymethylene polyphenyl polyisocyanate component comprising from 30 weight percent to 70 weight percent diphenylmethane diisocyanate, the remainder comprising polymethylene polyphenyl polyisocyanates having functionalities greater than two, said weight percentages based on the total weight of the ingredients in B);

C) and optionally a uretonimine-carbodiimide modified diisocyanate component comprising from 10 weight percent to 35 weight percent uretonimine-carbodiimide species, the remainder comprising essentially pure 4,4'-diphenylmethane diisocyanate, said weight percentages based on the weight of the ingredients in C);

said polyoxypropylene polyether polyol having a molecular weight ranging from greater than 1500 to 10,000 and an average functionality from 1.6 to about 3, the liquid polyisocyanate prepolymer having an overall NCO content of from 22 weight percent to 31 weight percent.

9. The process of claim 8, wherein the prepolymer is prepared at temperatures from 45° C. to 60° C.

10. The process of claim 9, wherein the prepolymer is prepared in the absence of an additional reaction scavenger.

11. The process of claim 8, wherein from 5 parts by weight to 48 parts by weight of the polyoxypropylene polyether polyol are reacted with the polyisocyanate blend.

12. The process of claim 11, wherein the blend contains from 45 weight percent to 70 weight percent of component A) and from 20 weight percent to 50 percent by weight of component B).

13. The process of claim 12, wherein the blend contains from 1 weight percent to 15 weight percent component C).

14. The process of claim 12, wherein component A) contains 60 weight percent to 80 weight percent 4,4'-diphenylmethane diisocyanate, 15 weight percent to 40 weight percent of 2,4'-diphenylmethane diisocyanate; and component B) contains 35 weight percent to 55 weight percent diphenylmethane diisocyanate comprised of less than 20 weight percent 2,4'-diphenylmethane based on the weight of all isomers in the diphenylmethane diisocyanates in component B), and from 45 weight percent to 65 weight percent of component B) being polymethylene polyphenyl polyisocyanate having a functionality greater than two.

15. The process of claim 14, wherein the NCO content is from 24 weight percent to 30 weight percent.

16. The process of claim 12, wherein the amount of component A) is 55 weight percent to 68 weight percent, and of component B) is 32 weight percent to 45 weight percent.

17. The process of claim 12, wherein the reaction is carried out temperatures from 45° C. to 55° C.

18. A polyisocyanate composition comprising the reaction product of an organic aromatic polyisocyanate blend and a polyoxypropylene polyether polyol, said polyisocyanate blend comprising:

A) a diphenylmethane diisocyanate component;

B) a polymethylene polyphenylene polyisocyanate component having functionalities greater than two; and, C) optionally a modified diphenylmethane diisocyanate;

said polyoxypropylene polyether polyol having a number average molecular weight ranging from 700 to 6,000 and an average functionality of from 1.6 to about 4, wherein the polyisocyanate composition has an overall free NCO content of from 22 weight percent to 31 weight percent.

19. The polyisocyanate composition of claim 18, wherein the amount of component A is from 55 weight percent to 68 weight percent of which 60 weight percent to 80 weight percent is 4,4'-diphenylmethane diisocyanate; component B is from 32 weight percent to 45 weight percent of which 30 weight percent to 70 weight percent is diphenylmethane diisocyanate and the remainder is polymethylene polyphenylene polyisocyanate having greater than two functionalities, and the polyol having a functionality of from 1.6 to 3.

20. The polyisocyanate composition of claim 19, wherein the polyol has an average functionality of from 2.4 to 3.

21. The polyisocyanate composition of claim 19, wherein the amount of 4,4'-diphenylmethane diisocyanate of component A is 70 weight percent to 75 weight percent; and the amount of diphenylmethane diisocyanate of component B is from 35 weight percent to 55 weight percent, the remainder being polyisocyanate having a functionality greater than two.

22. The polyisocyanate composition of claim 18, wherein said polyoxypropylene polyether polyol has a molecular weight ranging from greater than 1500 to 6000.

* * * * *